(12) United States Patent
Hoelzl

(10) Patent No.: US 10,598,214 B2
(45) Date of Patent: Mar. 24, 2020

(54) BEARING ELEMENT

(71) Applicant: Miba Gleitlager Austria GmbH, Laakirchen (AT)

(72) Inventor: Johannes Sebastian Hoelzl, Berg im Attergau (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 0 days.

(21) Appl. No.: 16/334,390

(22) PCT Filed: Oct. 19, 2017

(86) PCT No.: PCT/AT2017/060273
§ 371 (c)(1),
(2) Date: Mar. 19, 2019

(87) PCT Pub. No.: WO2018/071941
PCT Pub. Date: Apr. 26, 2018

(65) Prior Publication Data
US 2019/0234457 A1 Aug. 1, 2019

(30) Foreign Application Priority Data
Oct. 21, 2016 (AT) .................................. 50969/2016

(51) Int. Cl.
*F16C 17/10* (2006.01)
(52) U.S. Cl.
CPC .......... *F16C 17/10* (2013.01); *F16C 2300/14* (2013.01); *F16C 2360/31* (2013.01)
(58) Field of Classification Search
CPC ........ F16C 17/02; F16C 17/022; F16C 17/04; F16C 17/10; F16C 17/26; F16C 2360/31; F16C 2300/14; F16C 33/26
See application file for complete search history.

(56) References Cited

U.S. PATENT DOCUMENTS 3,709,573 A * 1/1973 Orkin ...................... F16C 17/10
384/264
4,243,274 A * 1/1981 Greene .................. F16C 17/10
384/111

(Continued)

FOREIGN PATENT DOCUMENTS

AT 509 625 B1 10/2011
DE 22 35 448 A1 2/1974

(Continued)

OTHER PUBLICATIONS

International Search Report in PCT/AT2017/060273, dated Jan. 24, 2018.

*Primary Examiner* — Alan B Waits
(74) *Attorney, Agent, or Firm* — Collard & Roe, P.C.

(57) ABSTRACT

A bearing element has at least one inner ring element and at least one outer ring element, wherein, between the inner ring element and the outer ring element, a sliding bearing system is disposed that is formed by at least two sliding bearings. The sliding bearings have a sliding face, which cooperates with a running face of the opposite ring element. In the new condition of the sliding bearing, the sliding face of the sliding bearing, viewed in cross section, has at least one first sub-portion and one second sub-portion, wherein a tangent constructed on the first sub-portion is disposed at a first angle relative to the central longitudinal axis and a tangent constructed on the second sub-portion is disposed at a second angle relative to the central longitudinal axis, wherein the first angle has a magnitude different from that of the second angle.

10 Claims, 5 Drawing Sheets

(56) References Cited

U.S. PATENT DOCUMENTS

| | | | |
|---|---|---|---|
| 4,245,870 A | | 1/1981 | Punshon et al. |
| 4,896,368 A | * | 1/1990 | Just ................... F16C 23/041 |
| | | | 384/276 |
| 5,732,441 A | * | 3/1998 | Janian ................ B60B 33/0028 |
| | | | 16/45 |
| 6,296,391 B1 | | 10/2001 | Hayakawa et al. |
| 9,279,413 B2 | | 3/2016 | Ebbesen et al. |
| 9,458,880 B2 | | 10/2016 | Kari et al. |
| 10,047,792 B2 | | 8/2018 | Guettler et al. |
| 2002/0126924 A1 | * | 9/2002 | Okamoto ................ F16C 9/04 |
| | | | 384/276 |
| 2006/0115191 A1 | | 6/2006 | Lee |
| 2007/0041672 A1 | * | 2/2007 | Maruyama ............ F16C 17/02 |
| | | | 384/279 |
| 2007/0286539 A1 | | 12/2007 | Leimann |
| 2011/0164840 A1 | * | 7/2011 | Hayashi ................ F16C 17/02 |
| | | | 384/416 |
| 2013/0071246 A1 | * | 3/2013 | Kari ..................... F16C 17/10 |
| | | | 416/174 |
| 2013/0142679 A1 | * | 6/2013 | Hombach ............. F01D 25/183 |
| | | | 417/406 |
| 2013/0287574 A1 | * | 10/2013 | Ebbesen ................ F03D 80/70 |
| | | | 416/170 R |
| 2015/0017000 A1 | * | 1/2015 | Sato ..................... F16C 41/004 |
| | | | 416/174 |
| 2016/0327099 A1 | * | 11/2016 | Nuissl ................... F16C 41/001 |
| 2016/0327148 A1 | * | 11/2016 | Dinter ..................... F16H 57/08 |
| 2017/0082141 A1 | * | 3/2017 | Mtauweg ................ F16C 17/10 |
| 2017/0260970 A1 | * | 9/2017 | Stiesdal .................. F03D 80/50 |
| 2019/0203768 A1 | * | 7/2019 | Meyer ..................... F03D 15/00 |
| 2019/0219036 A1 | * | 7/2019 | Elmose ................... F03D 17/00 |

FOREIGN PATENT DOCUMENTS

| | | |
|---|---|---|
| DE | 295 12 636 U1 | 10/1995 |
| DE | 103 51 524 A1 | 8/2004 |
| DE | 10 2010 053 671 A1 | 6/2012 |
| DE | 10 2013 221 265 A1 | 5/2015 |
| DE | 10 2014 205 637 A1 | 10/2015 |
| EP | 1 857 713 A1 | 11/2007 |
| EP | 2 657 519 A1 | 10/2013 |
| FR | 2 415 747 A1 | 8/1979 |
| JP | 2002-122134 A | 4/2002 |
| JP | 2004-122087 A | 4/2004 |
| JP | 2013-245767 A | 12/2013 |
| WO | 2015/058749 A1 | 4/2015 |

* cited by examiner

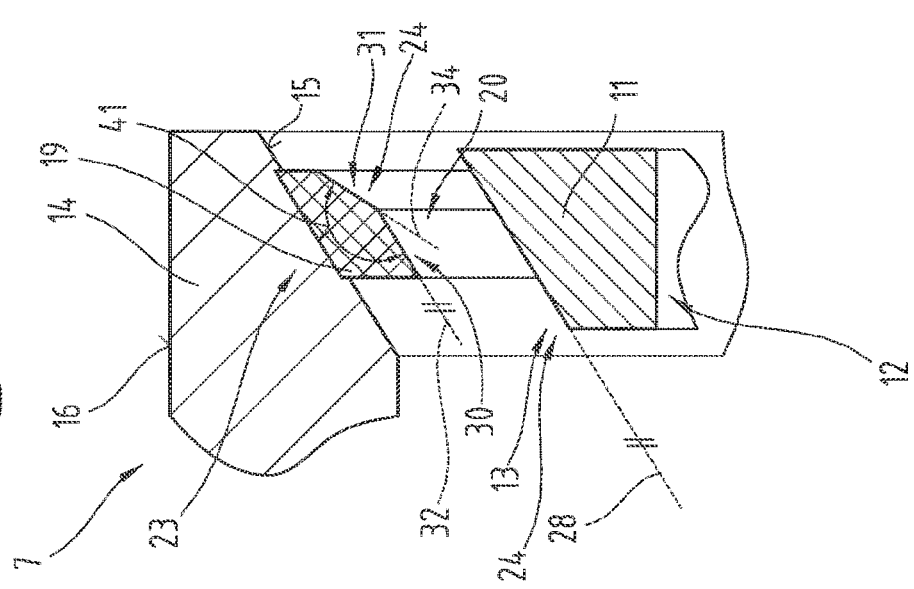
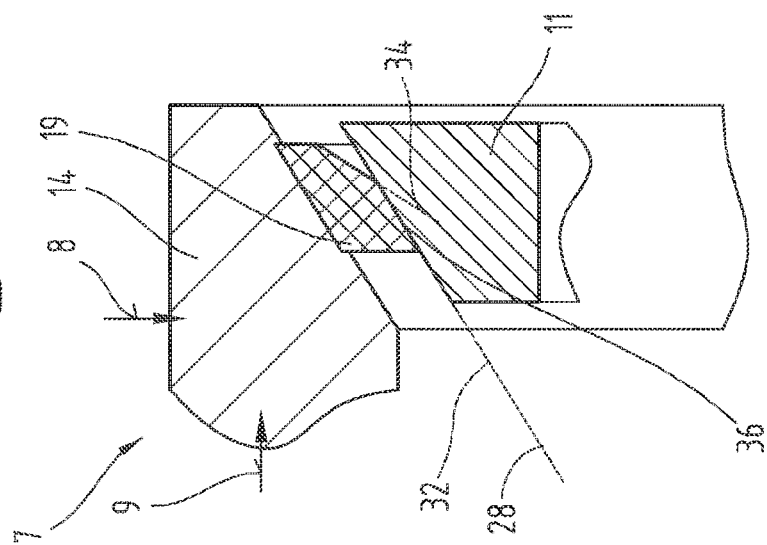
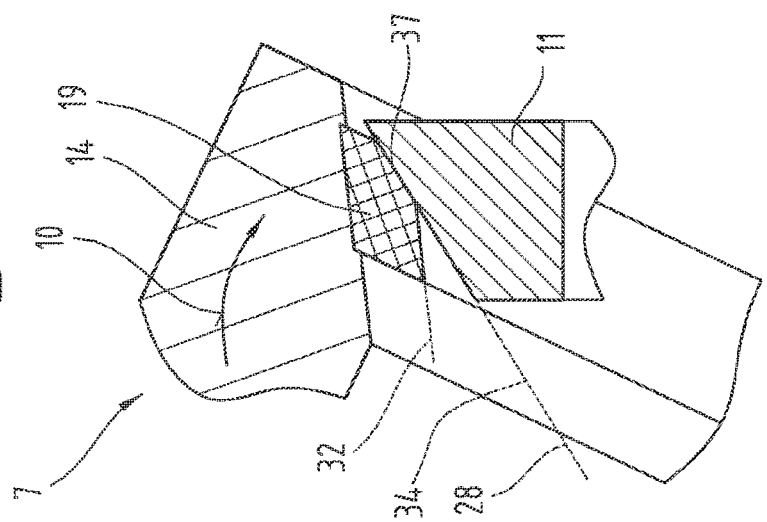

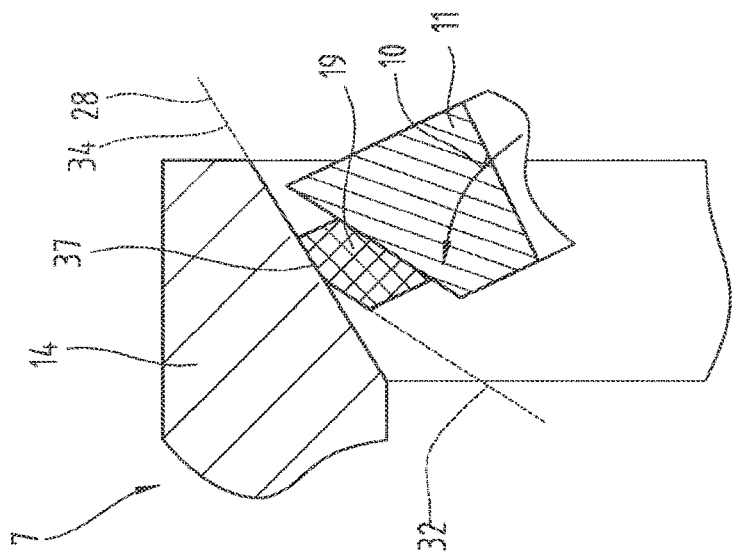
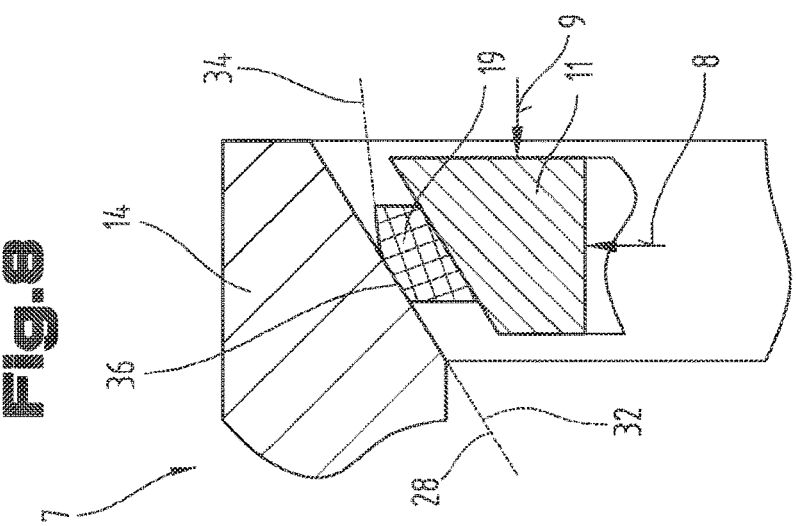
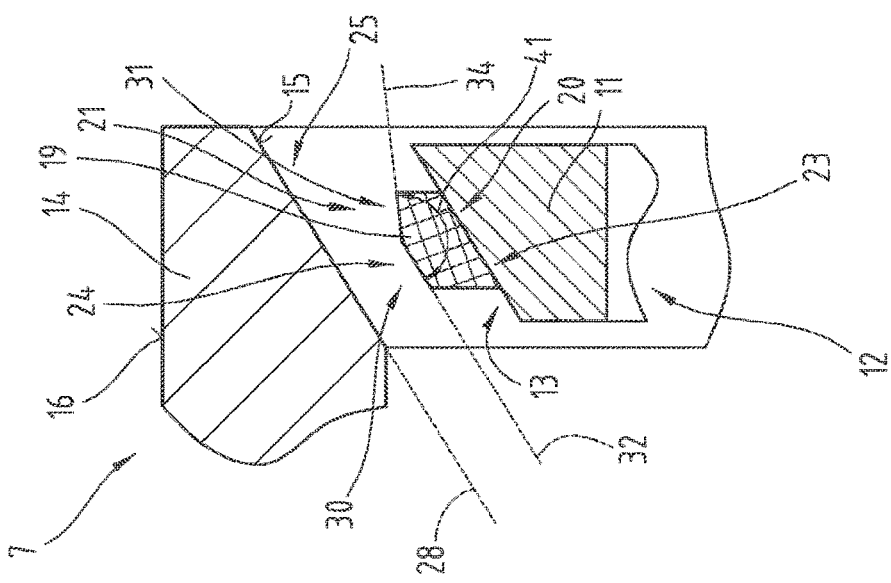

BEARING ELEMENT

CROSS REFERENCE TO RELATED APPLICATIONS

This application is the National Stage of PCT/AT2017/060273 filed on Oct. 19, 2017, which claims priority under 35 U.S.C. § 119 of Austrian Application No. A 50969/2016 filed on Oct. 21, 2016, the disclosure of which is incorporated by reference. The international application under PCT article 21(2) was not published in English.

The invention relates to a bearing element for the bearing system of a structural part.

From AT 509 625 B1, a bearing element is known for the bearing system of the rotor hub of a wind turbine. The bearing element comprises an outer ring, an inner ring and several sliding-bearing pads, which are disposed between the outer ring and the inner ring. The bearing element is designed for a radial or an axial force load and is able to absorb a superposed tilting torque to only limited extent.

The task of the present invention was to overcome the disadvantages of the prior art and to provide a bearing element by means of which a structural part loaded with a radial force, an axial force and a tilting torque can be mounted.

This task is accomplished by a device according to the claims.

According to the invention, a bearing element, especially a rotor-hub bearing system, is designed for the bearing system of a structural part to be loaded with a radial force, an axial force and a tilting torque. The bearing element comprises at least one inner ring element and at least one outer ring element, which in the unloaded condition are disposed coaxially with one another with respect to a central longitudinal axis, wherein, between the inner ring element and the outer ring element, a sliding-bearing system is disposed that is formed by at least two sliding bearings disposed at an axial spacing relative to one another. The sliding bearings are coupled on a receiving side with one of the ring elements and a sliding face, which cooperates with a running face of the opposite ring element, is formed opposite the receiving side. In the new condition of the sliding bearing, the sliding face of the sliding bearing, viewed in cross section, has at least one first sub-portion and one second sub-portion, wherein a tangent constructed on the first sub-portion is disposed at a first angle relative to the central longitudinal axis and a tangent constructed on the second sub-portion is disposed at a second angle relative to the central longitudinal axis, wherein the first angle has a magnitude different from that of the second angle.

For the construction of the bearing element according to the invention, it is of advantage that the first sub-portion may be designed in such a way that an axial force or a radial force acting on the bearing element can be effectively absorbed and that the second sub-portion may be designed in such a way that a tilting torque acting on the bearing element may be effectively absorbed. Due to the bearing element according to the invention—in contrast to conventional sliding bearings—a point load does not occur during a tilting of the inner ring element relative to the outer ring element, but instead at least a linear contact of the sliding face on the running face can be achieved even during a tilting of the inner ring element relative to the outer ring element. Thereby the surface pressure can be minimized compared with conventional bearing elements, whereby the wear on the bearing elements can also be minimized.

Furthermore, it may be expedient when a tangent, which is constructed on the running face of the ring element cooperating with the sliding bearing, is disposed at a third angle relative to the central longitudinal axis, wherein, in the unloaded condition, the third angle of the running face has the same magnitude as the first angle of the first sub-portion of the sliding face. It is then of advantage that a linear contact can be formed by this feature in a bearing element that is loaded with a radial force or axial force but that does not have any tilting between inner ring element and outer ring element and is not loaded with tilting torques.

Furthermore, it may be provided that the sliding bearing is coupled with the outer ring element and the sliding face is formed on the inner side of the sliding bearing and the running face is formed on the outer side of the inner ring element. Such a construction of the bearing element is advantageous when the outer ring element is designed as a rotating structural part and the inner ring element is constructed as a stationary structural part, since this leads to a reduced wear on the bearing element.

In an alternative embodiment variant, it may be provided that the sliding bearing is coupled with the inner ring element and the sliding face is formed on the outer side of the sliding bearing and the running face is formed on the inner side of the outer ring element. Such a construction of the bearing element is advantageous when the inner ring element is designed as a rotating structural part and the outer ring element is constructed as a stationary structural part, since this leads to a reduced wear on the bearing element.

Beyond this, it may be provided that at least one of the sliding bearings is formed by sliding-bearing pads disposed in distributed manner in circumferential direction. It is then of advantage that such sliding-bearing pads can be easily replaced or taken out in the maintenance situation, without the need to strip the complete bearing element in the process.

A manifestation is also advantageous according to which it may be provided that, in a sliding bearing having a sliding face disposed on the inner side, the first angle of the tangent constructed on the first sub-portion is smaller relative to the central longitudinal axis than the second angle of the tangent constructed on the second sub-portion relative to the central longitudinal axis, and that, in a sliding bearing having a sliding face disposed on the outer side, the first angle of the tangent constructed on the first sub-portion is larger relative to the central longitudinal axis than the second angle of the tangent constructed on the second sub-portion relative to the central longitudinal axis.

According to a further development, it is possible that, in a bearing element loaded by a radial force or an axial force, the running face of the ring element bears on the first sub-portion of the sliding face of the sliding bearing, especially along a first contact line, and the ring element and the sliding bearing can be twisted relative to one another around the central longitudinal axis, and that, in a bearing element loaded by a tilting torque, the running face of the ring element bears on the second sub-portion of the sliding face of the sliding bearing, especially along a second contact line, and the ring element and the sliding bearing can be twisted relative to one another around the central longitudinal axis. It is then of advantage that each of the two sub-portions are designed for load absorption in a special loading condition and thereby the possible useful life of the bearing element can be prolonged.

Furthermore, it may be expedient when the tangent of the second sub-portion is constructed in such a way or has such an angle that, in the unloaded condition of the bearing element, the tangent of the running face is turned around the center of the bearing element in a manner coinciding with the tangent of the second sub-portion. It is then of advantage that, during a loading of the bearing element with a tilting torque, and therefore in the tilted condition of the outer ring element relative to the inner ring element, the running face and the sliding face lie on one another along a second contact line.

Beyond this, it may be provided that the first sub-portion and the second sub-portion, viewed in cross section, are formed by straight lines, which are joined to one another by a transition radius. It is then of advantage that, viewed in cross section, the sub-portions formed by straight lines may cooperate with corresponding mating faces, likewise formed as straight lines when viewed in cross section, and in the process a linear contact is established. The transition radius is preferably chosen to be as small as possible. Preferably, the transition radius may be approximately zero and therefore the straight lines directly intersect one another and form an apex.

Furthermore, it may be provided that an opening angle between the tangent constructed on the first sub-portion and the tangent constructed on the second sub-portion amounts to between 175° and 179.99°, especially between 178° and 179.99°, preferably between 179° and 179.99°. It is then of advantage that, by realization of such an opening angle, correspondingly small bearing clearances can be achieved.

Furthermore, it may be provided that a wind turbine having a rotor hub and a gondola is formed, wherein the rotor hub is mounted on the gondola by means of the described bearing element.

A tangent may be constructed both on a convex curve, such as a circle, for example, as well as on a straight line. In the special case of a straight line, the tangent on the straight line lies on the straight line over the entire length.

The bearing element has the geometric construction in the new condition. This is of advantage in particular, since thereby an excessive wear of the sliding bearing is avoided as much as possible.

For better understanding of the invention, it will be explained in more detail on the basis of the following figures.

Therein, respectively in greatly simplified schematic diagrams:

FIG. 4 shows a schematic detail diagram of the first exemplary embodiment of the bearing element in the unloaded condition;

FIG. 5 shows a schematic detail diagram of the first exemplary embodiment of the bearing element in the condition loaded with an axial force and/or a radial force;

FIG. 6 shows a schematic detail diagram of the first exemplary embodiment of the bearing element in the condition loaded with a tilting torque;

FIG. 7 shows a schematic detail diagram of a second exemplary embodiment of the bearing element in the unloaded condition;

FIG. 8 shows a schematic detail diagram of the second exemplary embodiment of the bearing element in the condition loaded with an axial force and/or a radial force;

FIG. 9 shows a schematic detail diagram of the second exemplary embodiment of the bearing element in the condition loaded with a tilting torque.

By way of introduction, it is pointed out that like parts in the differently described embodiments are denoted with like reference symbols or like structural-part designations, wherein the disclosures contained in the entire description can be carried over logically to like parts with like reference symbols or like structural-part designations. The position indications chosen in the description, such as top, bottom, side, etc., for example, are also relative to the figure being directly described as well as illustrated, and these position indications are to be logically carried over to the new position upon a position change.

Figure 1:
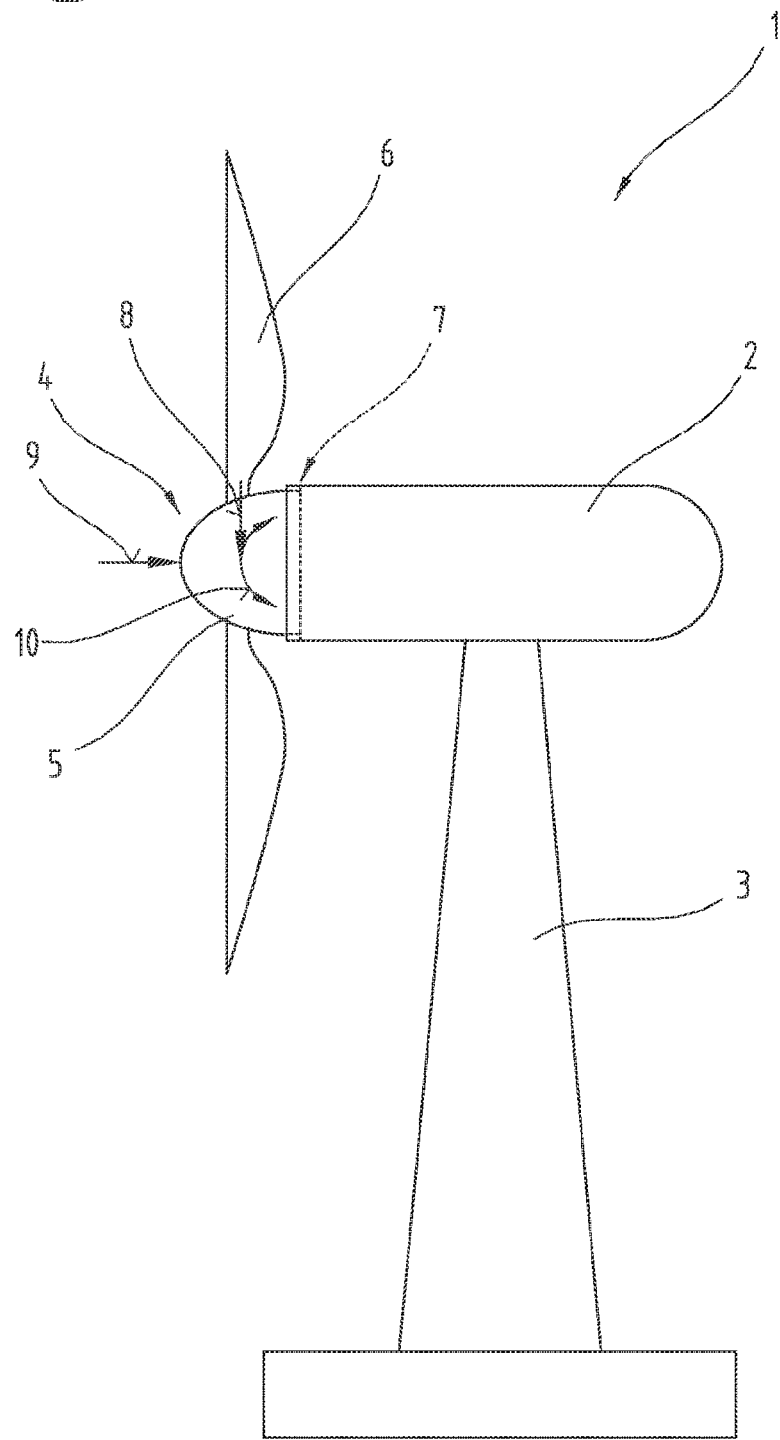
FIG. 1 shows an exemplary embodiment of a wind turbine.

FIG. 1 shows a schematic diagram of a wind turbine 1 for generation of electrical energy from wind energy. The wind turbine 1 comprises a gondola 2, which is received rotatably on a tower 3. The electrotechnical components such as, for example, generator of the wind turbine 1 are disposed in the gondola 2.

Furthermore, a rotor 4 is formed, which has a rotor hub 5 having rotor blades 6 disposed thereon. In particular, it is provided that the rotor hub 5 is received by means of a bearing element 7 in pivotably movable manner on the gondola 2.

It is of particular advantage when the bearing element 7 is designed in conformity with the descriptions provided in this document, since, especially during use of only one bearing element 7 for the bearing system of the rotor hub 5 on the gondola 2, both a radial force 8 and an axial force 9 as well as a tilting torque 10 must be absorbed by the bearing element 7. The axial force 9 is created by the force of the wind. The radial force 8 corresponds to the weight force of the rotor 4 and it acts at the center of gravity of the rotor 4. Since the center of gravity of the rotor 4 is located outside the bearing element 7, the tilting torque 10 in the bearing element 7 is caused by the radial force 8. The tilting torque 10 may likewise be caused by an uneven load of the rotor blades 6.

Alternatively to the use of the bearing element 7 in a wind turbine 1, it is also conceivable that a bearing element 7 designed in such a way is used, for example, on a slewing ring of an excavator or on another application where both a radial force 8 and/or an axial force 9 as well as a tilting torque 10 act on the bearing element 7.

The bearing elements 7 according to the invention may have, for example, a diameter between 0.5 m and 5 m. Naturally, it is also conceivable that the bearing elements 7 are smaller or larger.

Figure 2:
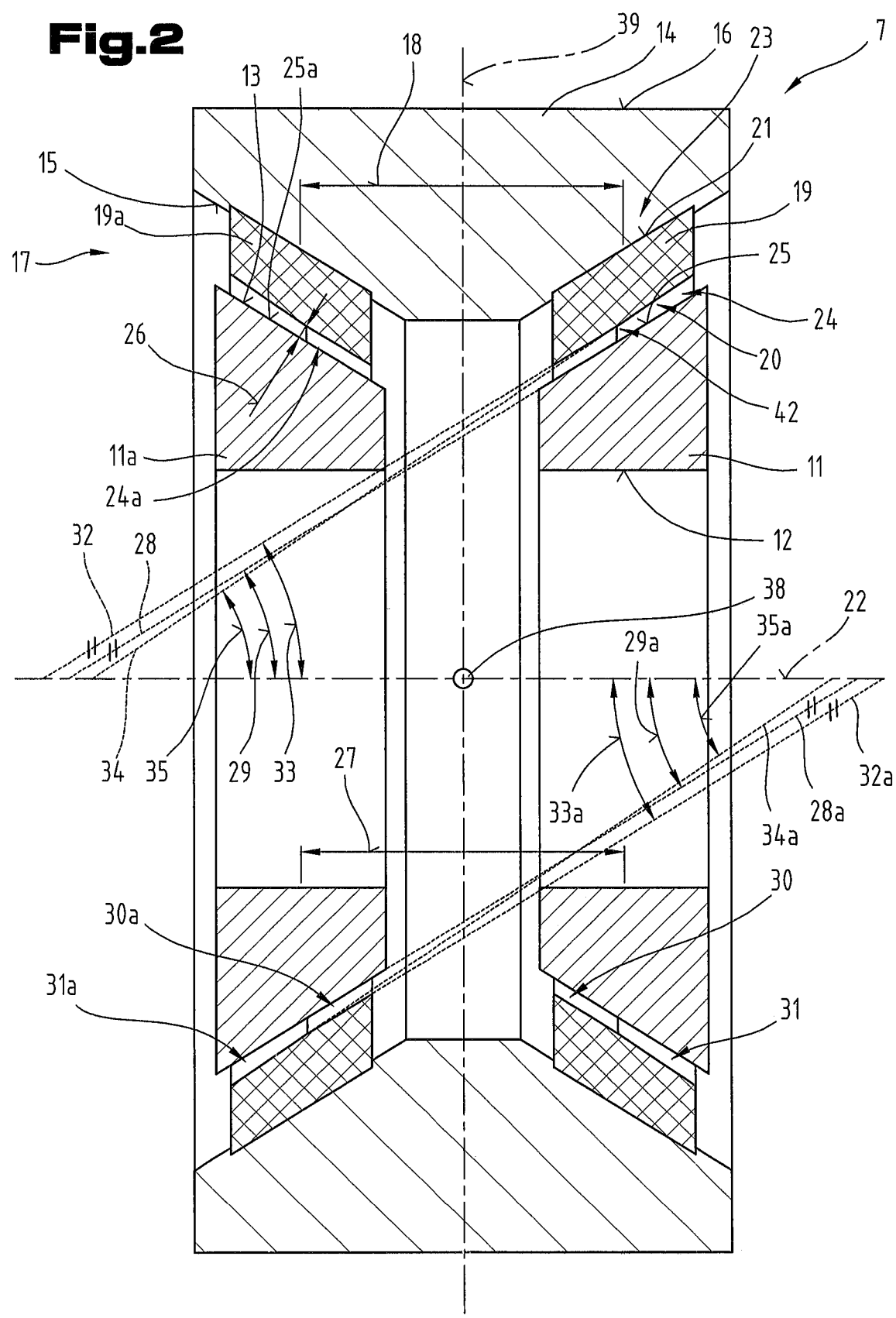
FIG. 2 shows a cross-sectional diagram of a first exemplary embodiment of a bearing element in the unloaded condition.
Figure 3:
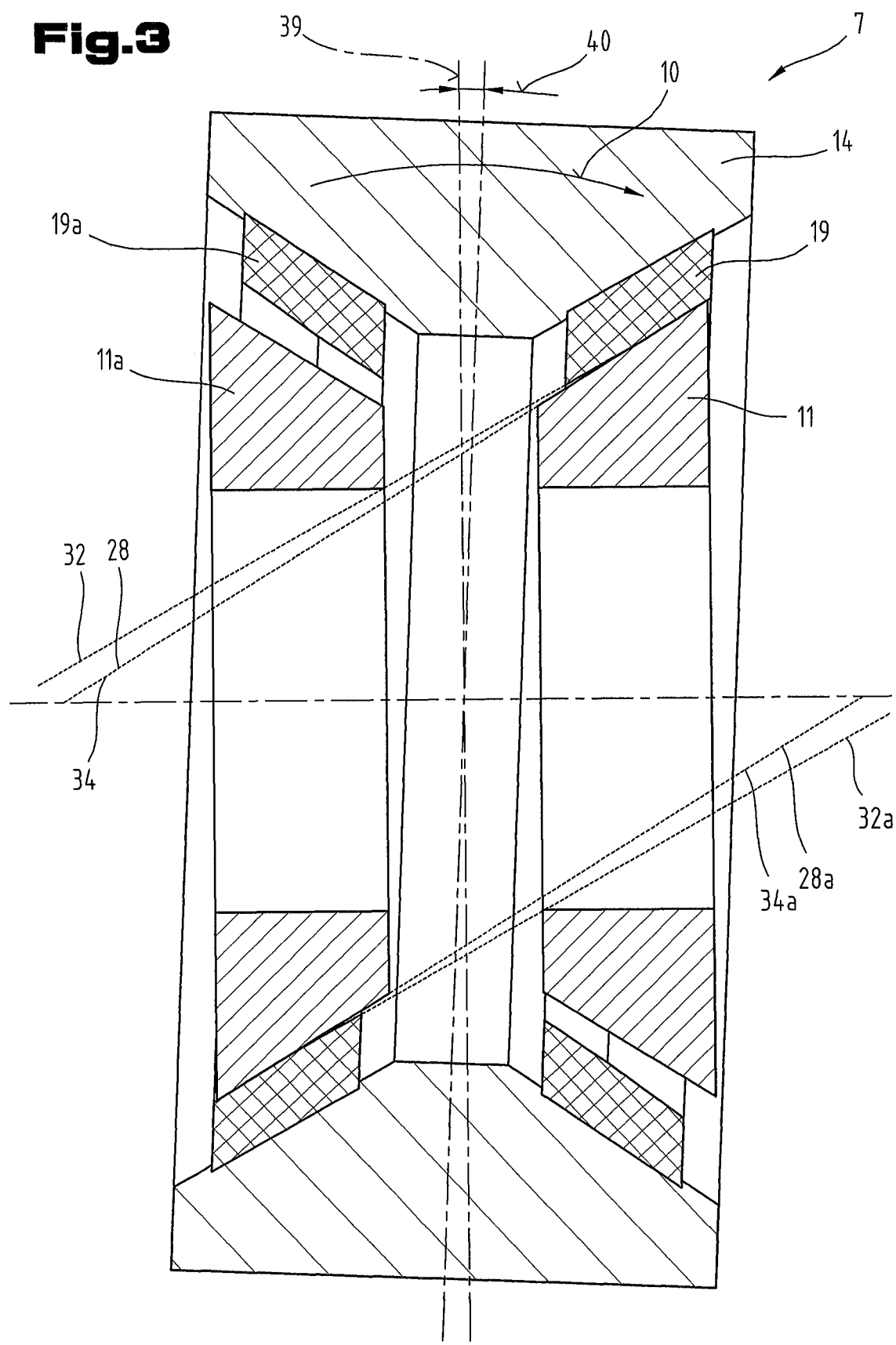
FIG. 3 shows a cross-sectional diagram of the first exemplary embodiment of the bearing element in the condition loaded with a tilting torque.

In FIG. 2, a first exemplary embodiment of the bearing element 7 is illustrated in an unloaded condition. In FIG. 3, the first exemplary embodiment of the bearing element 7 from FIG. 2 is illustrated in a condition loaded with a tilting torque 10, wherein, once again, like reference symbols or structural-part designations are used for like parts, as in the foregoing FIG. 2. In order to avoid unnecessary repetitions, the bearing element 7 will be described on the basis of an integrated view of FIGS. 2 and 3.

The bearing element 7 comprises at least one inner ring element 11, which has an inner side 12 and an outer side 13. Furthermore, an outer ring element 14 is provided, which has an inner side 15 and an outer side 16. Moreover, a sliding bearing system 17, which comprises at least first and second sliding bearings 19, 19a spaced apart from one another at an axial spacing 18, is formed between the inner ring element 11 and the outer ring element 14. The two sliding bearings 19, 19a respectively have an inner side 20 and an outer side 21.

In the diagram of FIG. 2, the bearing element 7 is illustrated in an unloaded condition. An unloaded condition is defined here as that condition in which no forces, and therefore not even any forces of gravity act on the bearing element 7. This condition is fictional and will therefore be presented merely for illustration of the structural parts and the function of the bearing element 7. As is evident from FIG. 2, in the unloaded condition of the bearing element 7, the inner ring element 11 and the outer ring element 14 and the sliding bearing 19 are disposed concentrically with respect to a common central longitudinal axis 22.

In the first exemplary embodiment of the bearing element 7, as is illustrated in FIGS. 2 to 6, the sliding bearings 19, 19a are coupled with the outer ring element 14. In the present exemplary embodiment, the side of the sliding bearing 19 that is coupled with the outer ring element 14 is referred to as the outer side 23 of the sliding bearing. On the receiving side 23 of the sliding bearing 19, no relative movement takes place between the sliding bearing 19 and the outer ring element 14. Such a coupling of the sliding bearing 19 with the outer ring element 14 may be achieved, for example, by features such as have already been described in AT 509 625 BI.

Furthermore, it is also conceivable that the sliding bearing 19 is received in the outer ring element 14 by means of, for example, an adhesive joint. In yet another exemplary embodiment, it is also possible that the sliding bearing 19 is received interlockingly, for example, in the outer ring element 14.

In this case, the sliding bearing 19 may be subdivided into several ring segments distributed over the circumference. Furthermore, it is also conceivable that the sliding bearing 19 is designed as an individual circumferential ring. Such a circumferential ring may be inserted, for example, into the outer ring element 14, wherein, due to a frictional joint, an induced rotation of the sliding bearing 19 relative to the outer ring element 14 is suppressed.

Opposite each receiving side 23 of the first and second sliding bearing 19, 19a, a sliding face 24, 24a is formed, which cooperates with a running face 25, 25a of the inner ring element 11, 11a. In the first exemplary embodiment, the outer side 13 of the inner ring element 11, 11a, respectively, is designed as the running face 25, 25a.

In the first exemplary embodiment in particular, it is provided that the sliding bearing 19 is twisted relative to the inner ring element 11, and a sliding movement between the sliding face 24 of the sliding bearing 19 and the running face 25 of the inner ring element 11 is permitted. Thereby the function of the bearing element 7 can be realized. The exact function or the exact relationships of the bearing element 7 are shown in detail in FIGS. 4 to 6, or these diagrams serve as a supplement to the understanding of the first exemplary embodiment of the bearing element 7.

Between the inner ring element 11 and the sliding bearing 19, a bearing clearance 26 is formed, as illustrated in FIG. 2.

At this place, it must be mentioned that the bearing clearance 26 is illustrated in exaggerated size for clarity, not only in FIGS. 2 and 3 but also in FIGS. 4 to 6 as well as 7 to 9. Especially in FIGS. 4 to 6 as well as 7 to 9, the geometry of the sliding-bearing system is illustrated in greatly exaggerated manner, in order to be able to illustrate the function and the technical effects clearly.

As is evident from FIG. 2, it may be provided that two inner ring elements 11, 11a are formed, which are disposed at a spacing 27 relative to one another. The outer sides 13 of the first and second inner ring elements 11, 11a are respectively conically designed and turned toward one another. Due to the spacing 27 of the two inner ring elements 11, 11a relative to one another, the bearing clearance 26 may be adjusted.

The running face 25 is a face that is designed to be rotationally symmetric with respect to the central longitudinal axis 22 and that may have the special shape of a truncated cone. Viewed in the cross section of the bearing element 7, as illustrated in FIG. 2, the running face 25 forms a straight line. If a tangent 28 is constructed on the running face 25, this tangent 28 is formed at an angle 29 with respect to the central longitudinal axis 22.

As is evident from FIG. 2, and particularly clearly in the exaggerated illustration according to FIG. 4, it is provided that the first sliding bearing 19 has a first sub-portion 30 and a second sub-portion 31 on its first sliding face 24. As is also evident from FIG. 2, it is provided that the second sliding bearing 19a has a third sub-portion 30a and a fourth sub-portion 31a on its second sliding face 24a.

A first tangent 32 constructed on the first sub-portion 30 is disposed at a first angle 33 relative to the central longitudinal axis 22. A second tangent 34 constructed on the second sub-portion 31 is disposed at a second angle 35 relative to the central longitudinal axis 22. A third tangent 32a constructed on the third sub-portion 30, 30a is disposed at a third angle 33a relative to the central longitudinal axis 22. A fourth tangent 34a constructed on the fourth sub-portion 31a is disposed at a fourth angle 35a relative to the central longitudinal axis 22.

In particular, it is provided that the second angle 35 of the second sub-portion 31 of the first sliding bearing 19 and the first angle 33 of the first sub-portion 30 have different magnitudes, and the fourth angle 35a of the fourth sub-portion 31a and the third angle 33a of the third sub-portion 30a have different magnitudes. Furthermore, it is provided that the angle 29, 29a of the running face 25, 25a and the angle 33, 33a of the first sub-portion 30 and third sub-portion 30a, respectively, have the same magnitudes and thus, in the unloaded condition of the bearing element 7, the tangent 28, 28a of the running face 25, 25a, respectively, and the tangent 32, 32a of the first sub-portion 30 and third sub-portion 30a, respectively, are situated parallel to one another. Considered in the three-dimensional representation, the running face 25, 25a and the first sub-portion 30 and third sub-portion 30a, respectively, therefore have a shell surface of a truncated cone with the same opening angle.

When the bearing element 7, as illustrated in FIG. 5, is loaded with an axial force 9 and/or a radial force 8, the first sub-portion 30 of the sliding face 24 of the sliding bearing 19 and the running face 25 of the inner ring element 11 come to bear on one another along a first contact line 36. The sliding face 24 of the sliding bearing 19 and the running face 25 of the inner ring element 11 therefore contact one another along the first contact line 36, since the radial force 8 or the axial force 9 cause a parallel shift of the two structural parts relative to one another. The parallel shift naturally varies in the range of hundredths to tenths of one millimeter, and is illustrated in greatly exaggerated manner.

However, if a tilting torque 10 is transmitted into the bearing element 7 according to the diagram in FIGS. 3 and 6, a tilting of the outer ring element 14 relative to the inner ring element 11 takes place, whereby the second sub-portion 31 of the sliding face 24 of the sliding bearing 19 bears on the running face 25 of the inner ring element 11 along a second contact line 37.

As is evident from FIG. 3, the two sliding bearings 19, 19a then lie on the first and second inner ring elements 11, 11a in diagonally opposite manner. During this described tilting, a twisting of the outer ring element 14 relative to the inner ring 11 occurs in particular with respect to a fulcrum 38, which is located at the point of intersection between the central longitudinal axis 22 and a longitudinal middle axis 39.

Naturally it is ideal when, after the said tilting of the outer ring element 14, the tangent 28 of the running face 25 and the tangent 34 of the second sub-portion 31 of the sliding face 24 of the sliding bearing 19 are situated coincidingly on one another. Thereby, even during a loading of the bearing element 7 by a tilting torque 10, a linear contact therefore takes place between the sliding face 24 and the running face 25, whereby the surface pressure and thus the wear on the sliding face 24 may be reduced.

The coincidence of the tangent 34 of the second sub-portion 31 and of the tangent 28 of the running face 25 after the tilting can be achieved in that, during the construction of the sliding bearing 19 in the unloaded condition corresponding to FIG. 2, the tangent 28 on the running face 25 is taken and twisted by a certain angle with respect to the fulcrum 38, so that this forms the tangent 34 of the second sub-portion 31 and is intersected by the tangent 32 of the first sub-portion 30 at approximately the middle of the sliding bearing 19. The magnitude of this angle, by which the tangent 28 on the running face 25 is twisted during the construction of the sliding bearing 19, then determines the maximum deflection angle 40.

Between the tangent 34 of the second sub-portion 31 and the tangent 32 of the first sub-portion 30, an opening angle 41 is formed that corresponds to an angle of 180° minus the maximum deflection angle 40. For correspondingly small bearing clearance 26, which varies in the range of hundredths of one millimeter to tenths of one millimeter, the maximum deflection angle 40 accordingly also lies in the range of hundredths to tenths of one degree.

Furthermore, it may be provided that a fabrication-related transition radius 42 is formed between the first sub-portion 30 and the second sub-portion 31. Preferably, the transition radius 42 will turn out to be as small as possible, so that the first contact line 36 and the second contact line 37 are as long as possible and thus the least possible surface pressure occurs between the sliding face 24 of the sliding bearing 19 and the running face 25 of the inner ring element 11. Stated in other words, in the ideal case the first sub-portion 30 and the second sub-portion 31 will adjoin one another directly or if at all possible without transition radius 42.

A further and as the case may be independent embodiment of the bearing element 7 is shown in a second exemplary embodiment in FIGS. 7 to 9, wherein once again like reference symbols or structural-part designations are used for like parts, as in the foregoing FIGS. 2 to 6. To avoid unnecessary repetitions, the detailed description in the foregoing FIGS. 2 to 6 is invoked or reference is made thereto.

In the second exemplary embodiment of the bearing element 7, it may be provided that the sliding bearing 19 is coupled with the inner ring element 11 and a sliding movement takes place between the sliding bearing 19 and the outer ring element 14.

As is evident from the second exemplary embodiment, the sliding bearing 19 may be coupled with the inner ring element 11 and thus the receiving side 23 of the sliding bearing 19 may be formed on its inner side 20. Corresponding to this, the sliding face 24 of the sliding bearing 19 in this exemplary embodiment is formed on its outer side 21 and cooperates with the inner side 15 of the outer ring element 14, which in this exemplary embodiment is formed as the running face 25.

The relationships between the first sub-portion 30 and the second sub-portion 31 of the sliding face 24 of the sliding bearing 19 and the running face 24, cooperating therewith, of the outer ring element 14 behave in a manner analogous to the first exemplary embodiment already described in FIGS. 2 to 6. For the sake of brevity, the second exemplary embodiment will therefore not be described separately in detail, but instead the function is clearly evident to the person skilled in the art on the basis of the description for the first exemplary embodiment described in FIGS. 2 to 6 or on the basis of FIGS. 7 to 9.

Such a second exemplary embodiment of the bearing element 7 having an internally disposed sliding bearing 19, as illustrated in FIGS. 7 to 9, will be used preferably when the outer ring element 14 is designed to be immovable and the inner ring element 11 together with the sliding-bearing element 19 can be twisted relative to the outer ring element 14.

The exemplary embodiments show possible embodiment variants, wherein it must be noted at this place that the invention is not restricted to the specially illustrated embodiment variants of the same, but to the contrary diverse combinations of the individual embodiment variants with one another are also possible and, on the basis of the teaching of the technical handling by the subject invention, this variation possibility lies within the know-how of the person skilled in the art and active in this technical field.

The scope of protection is defined by the claims. However, the description and the drawings are to be used for interpretation of the claims. Individual features or combinations of features from the shown and described different exemplary embodiments may represent inventive solutions that are independent in themselves. The task underlying the independent inventive solutions may be inferred from the description.

All statements about value ranges in the description of the subject matter are to be understood to the effect that they jointly comprise any desired and all sub-ranges therefrom, e.g. the statement 1 to 10 is to be understood to the effect that all sub-ranges, starting from the lower limit 1 and the upper limit 10 are jointly comprised, i.e. all sub-ranges begin with a lower range of 1 or greater and end at an upper limit of 10 or smaller, e.g. 1 to 1.7, or 3.2 to 8.1, or 5.5 to 10.

Finally, it must be pointed out, as a matter of form, that some elements have been illustrated not to scale and/or enlarged and/or reduced for better understanding of the structure.

LIST OF REFERENCE NUMERALS

1 Wind turbine
2 Gondola
3 Tower
4 Rotor
5 Rotor hub
6 Rotor blade
7 Bearing element
8 Radial force
9 Axial force
10 Tilting torque
11 First Inner ring element 11a Second Inner ring element
12 Inner side of inner ring element
13 Outer side of inner ring element
14 Outer ring element
15 Inner side of outer ring element
16 Outer side of outer ring element
17 Sliding bearing system
18 Axial spacing
19 First Sliding bearing
19a Second Sliding bearing
20 Inner side of sliding bearing
21 Outer side of sliding bearing
22 Central longitudinal axis
23 Outer side of sliding bearing
24 First Sliding face of first sliding bearing
24a Second Sliding face of second sliding bearing
25 First Running face
25a Second Running face
26 Bearing clearance
27 Spacing of inner ring elements
28 Tangent of first running face
28a Tangent of second running face
29 Angle of first running face
29a Angle of second running face
30 First sub-portion
30a Third sub-portion
31 Second sub-portion
31a Fourth sub-portion
32 First Tangent of first sub-portion
32a Third Tangent of third sub-portion
33 First Angle of first sub-portion
33a Third Angle of third sub-portion
34 Second Tangent of second sub-portion
34a Fourth Tangent of fourth sub-portion
35 Second Angle of second sub-portion
35a Fourth Angle of fourth sub-portion
36 First contact line
37 Second contact line
38 Fulcrum
39 Longitudinal middle axis
40 Maximum deflection angle
41 Opening angle
42 Transition radius

The invention claimed is:

1. A bearing element for the bearing system of a structural part to be loaded with a radial force and an axial force and a tilting torque, having
at least a first inner ring element and
a second inner ring element and
at least one outer ring element,
which in the unloaded condition are disposed coaxially with one another with respect to a central longitudinal axis,
wherein, between the first inner ring element and the outer ring element a first sliding bearing is disposed and between the second inner ring element and the outer ring element a second sliding bearing is disposed,
wherein the first sliding bearing and the second sliding bearing are disposed at an axial spacing relative to one another,
wherein the first sliding bearing is coupled on a first receiving side with one of the first inner ring element or the outer ring element, and a first sliding face, which cooperates with a first running face of the opposite first inner ring element or outer ring element, is formed opposite the first receiving side, and
wherein the second sliding bearing is coupled on a second receiving side with one of the second inner ring element or the outer ring element and a second sliding face, which cooperates with a second running face of the opposite second inner ring element or outer ring element, is formed opposite the first receiving side,
wherein, in the new condition of the first sliding bearing and the second sliding bearing, the first sliding face of the first sliding bearing, viewed in cross section, has at least one first sub-portion and one second sub-portion, and the second sliding face of the second sliding bearing, viewed in cross section, has at least one third sub-portion and one fourth sub-portion,
wherein a tangent constructed on the first sub-portion of the first sliding bearing is disposed at a first angle relative to the central longitudinal axis and a tangent constructed on the second sub-portion of the first sliding bearing is disposed at a second angle relative to the central longitudinal axis,
wherein the first angle has a magnitude different from that of the second angle,
wherein a tangent constructed on the third sub-portion of the second sliding bearing is disposed at a third angle relative to the central longitudinal axis and a tangent constructed on the fourth sub-portion of the second sliding bearing is disposed at a fourth angle relative to the central-longitudinal axis,
wherein the third angle has a magnitude different from that of the fourth angle.

2. The bearing element according to claim 1,
wherein a tangent, which is constructed on the running face of the ring element cooperating with the sliding bearing, is disposed at a fifth angle relative to the central longitudinal axis,
wherein, in an unloaded condition, the fifth angle of the running face has the same magnitude as the first angle of the first sub-portion of the sliding face.

3. The bearing element according to claim 1,
wherein the first sliding bearing is coupled with the outer ring element and the first sliding face is formed on the inner side of the first sliding bearing and the first running face is formed on the outer side of the first inner ring element and
wherein the second sliding bearing is coupled with the outer ring element and the second sliding face is formed on the inner side of the second sliding bearing and the second running face is formed on the outer side of the second inner ring element.

4. The bearing element according to claim 1,
wherein, the first sliding bearing has the first sliding face disposed on the inner side, and the first angle of the first tangent constructed on the first sub-portion is smaller relative to the central longitudinal axis than the second angle of the second tangent constructed on the second sub-portion relative to the central longitudinal axis, or
the first sliding bearing has the first sliding face disposed on the outer side, and the first angle of the first tangent constructed on the first sub-portion is larger relative to the central longitudinal axis than the second angle of the second tangent constructed on the second sub-portion relative to the central longitudinal axis.

5. The bearing element according to claim 1,
wherein, when the bearing element is loaded by a radial force or an axial force, the first running face of the first inner ring element bears on the first sub-portion of the first sliding face of the first sliding bearing along a first contact line, and the outer ring element and the first sliding bearing are twistable relative to one another around the central longitudinal axis, and wherein, when the bearing element is loaded by a tilting torque, the first running face of the first inner ring element bears on the second sub-portion of the first sliding face of the first sliding bearing along a second contact line, and the outer ring element and the first sliding bearing are twistable relative to one another around the central longitudinal axis.

6. The bearing element according to claim 1, wherein the first sub-portion and the second sub-portion, viewed in cross section, are formed by straight lines, which are joined to one another by a transition radius.

7. The bearing element according to claim 1, wherein an opening angle between the first tangent constructed on the first sub-portion and the second tangent constructed on the second sub-portion amounts to between 175° and 179.99°.

8. A wind turbine having a rotor hub and a gondola, wherein the rotor hub is mounted on the gondola by means of the bearing element according to claim 1.

9. A bearing element for the bearing system of a structural part to be loaded with a radial force and an axial force and a tilting torque, having
at least a first inner ring element and
a second inner ring element and
at least one outer ring element,
which in the unloaded condition are disposed coaxially with one another with respect to a central longitudinal axis,
wherein, between the first inner ring element and the outer ring element, a first sliding bearing is disposed and between the second inner ring element and the outer ring element a second sliding bearing is disposed,
wherein the first sliding bearing and the second sliding bearing are disposed at an axial spacing relative to one another,
wherein the first sliding bearing is coupled on a first receiving side with one of the first inner ring element or the outer ring element, and a first sliding face, which cooperates with a first running face of the opposite first inner ring element or outer ring element, is formed opposite the first receiving side, and
wherein the second sliding bearing is coupled on a second receiving side with one of the second inner ring element or the outer ring element and a second sliding face, which cooperates with a second running face of the opposite second inner ring element or outer ring element, is formed opposite the first receiving side,
wherein, in the new condition of the first sliding bearing and the second sliding bearing, the first sliding face of the first sliding bearing, viewed in cross section, has at least one first sub-portion and one second sub-portion, and the second sliding face of the second sliding bearing, viewed in cross section, has at least one third sub-portion and one fourth sub-portion,
wherein a tangent constructed on the first sub-portion of the first sliding bearing is disposed at a first angle relative to the central longitudinal axis and a tangent constructed on the second sub-portion of the first sliding bearing is disposed at a second angle relative to the central longitudinal axis,
wherein the first angle has a magnitude different from that of the second angle,
wherein a tangent constructed on the third sub-portion of the second sliding bearing is disposed at a third angle relative to the central longitudinal axis and a tangent constructed on the fourth sub-portion of the second sliding bearing is disposed at a fourth angle relative to the central longitudinal axis,
wherein the third angle has a magnitude different from that of the fourth angle,
wherein when the bearing element is loaded by a radial force, the first running face of the first ring element bears on the first sub-portion of the first sliding face of the first sliding bearing and the second running face of the second ring element bears on the third sub-portion of the second sliding face of the second sliding bearing, and
wherein when the bearing element is loaded by a tilting torque, the first running face of the first ring element bears on the second sub-portion of the first sliding face of the first sliding bearing and the second running face of the second ring element bears on the fourth sub-portion of the second sliding face of the second sliding bearing.

10. A bearing element for the bearing system of a structural part to be loaded with a radial force and an axial force and a tilting torque, having
at least a first inner ring element and
a second inner ring element and
at least one outer ring element,
which in the unloaded condition are disposed coaxially with one another with respect to a central longitudinal axis,
wherein, between the first inner ring element and the outer ring element, a first sliding bearing is disposed and between the second inner ring element and the outer ring element a second sliding bearing is disposed,
wherein the first sliding bearing and the second sliding bearing are disposed at an axial spacing relative to one another,
wherein the first sliding bearing is coupled on a first receiving side with one of the first inner ring element or the outer ring element, and a first sliding face, which cooperates with a first running face of the opposite first inner ring element or outer ring element, is formed opposite the first receiving side, and
wherein the second sliding bearing is coupled on a second receiving side with one of the second inner ring element or the outer ring element and a second sliding face, which cooperates with a second running face of the opposite second inner ring element or outer ring element, is formed opposite the first receiving side,
wherein, in the new condition of the first sliding bearing and the second sliding bearing, the first sliding face of the first sliding bearing, viewed in cross section, has at least one first sub-portion and one second sub-portion, and the second sliding face of the second sliding bearing, viewed in cross section, has at least one third sub-portion and one fourth sub-portion wherein a tangent constructed on the first sub-portion of the first sliding bearing is disposed at a first angle relative to the central longitudinal axis and a tangent constructed on the second sub-portion of the first sliding bearing is disposed at a second angle relative to the central longitudinal axis,
wherein the first angle has a magnitude different from that of the second angle,
wherein a tangent constructed on the third sub-portion of the second sliding bearing is disposed at a third angle relative to the central longitudinal axis and a tangent constructed on the fourth sub-portion of the second sliding bearing is disposed at a fourth angle relative to the central longitudinal axis, wherein the third angle has a magnitude different from that of the fourth angle,
wherein the first sub-portion, the second sub-portion, the third sub-portion, the fourth sub-portion, the first running face and the second running face all have a shell surface of a truncated cone, wherein the first sub-portion and the first running face have the same opening angle and wherein the third sub-portion and the second running face have the same opening angle.

\* \* \* \* \*